US012160522B2

(12) United States Patent
Sumner (10) Patent No.: US 12,160,522 B2
(45) Date of Patent: Dec. 3, 2024

(54) SECURITY SYSTEM

(71) Applicant: Custodiex Ltd, Manchester (GB)

(72) Inventor: Michael John Sumner, London (GB)

(73) Assignee: Custodiex Ltd, Manchester (GB)

( * ) Notice: Subject to any disclaimer, the term of this patent is extended or adjusted under 35 U.S.C. 154(b) by 248 days.

(21) Appl. No.: 17/952,560

(22) Filed: Sep. 26, 2022

(65) Prior Publication Data

US 2023/0107805 A1 Apr. 6, 2023

(30) Foreign Application Priority Data

Sep. 27, 2021 (GB) .................................... 2113766

(51) Int. Cl.
*H04L 9/32* (2006.01)
*G06F 21/60* (2013.01)
*G06F 21/62* (2013.01)
*G06F 21/64* (2013.01)
*H04L 9/08* (2006.01)

(52) U.S. Cl.
CPC .......... *H04L 9/3247* (2013.01); *H04L 9/3242* (2013.01)

(58) Field of Classification Search
CPC ... H04L 9/3247; H04L 9/3242; H04L 9/0877; H04L 9/088; H04L 9/0897; H04L 9/3236; H04L 9/50; H04L 9/3234; G06F 21/602; G06F 21/6218; G06F 21/64
See application file for complete search history.

(56) References Cited

U.S. PATENT DOCUMENTS

| 10,708,042 | B1* | 7/2020 | Rubenstein | ........... H04L 9/0643 |
| 2019/0372779 | A1 | 12/2019 | Monica et al. | |
| 2020/0111080 | A1 | 4/2020 | Metcalfe et al. | |
| 2021/0056540 | A1* | 2/2021 | McCauley | ......... G06Q 20/3674 |
| 2021/0056547 | A1* | 2/2021 | Monica | ................ H04L 9/0637 |
| 2022/0269811 | A1* | 8/2022 | Gummadivalli | .... G06F 21/6245 |

OTHER PUBLICATIONS

Jun. 28, 2022 (GB) Search Report—App 2113766.6.
Nov. 8, 2022—International Search Report and Written Opinion—App PCT/GB2022/052426.

* cited by examiner

*Primary Examiner* — Amie C. Lin
(74) *Attorney, Agent, or Firm* — Banner & Witcoff, Ltd.

(57) ABSTRACT

The present disclosure relates to a system and method for providing secure access to an asset, for example, in the form of a cryptographic key needed to perform cryptographic operations, such as signing transactions of digital assets. The system makes use of three interrelated data objects; a policy object that defines access control rules, one or more online vault objects that are linked to the policy object, and one or more assets that are linked to one of the vault objects. The policy object and the assets are all created in a cold storage environment, with their integrity being protected using a key-based cryptographic technique. The vault object is created in an online environment, wherein a cryptographic hash is used to generate a vault ID, with specific data fields within the vault object being used as inputs to the hash function.

19 Claims, 6 Drawing Sheets

SECURITY SYSTEM

FIELD

The present disclosure relates to a security system and method for providing secure access to a digital asset object.

BACKGROUND

It is common to use cold storage for protecting digital assets, such as private cryptographic keys used for signing or encrypting data, from cyber-attacks. Cold storage typically protects the private cryptographic keys needed for securely applying an authorised signature to electronic objects, such as digital assets associated with the private key (for example, financial assets) or any other suitable form of data, by implementing an "air gap" from external networks such as the internet. This means that there is no connection to external networks and thus no way that these keys can be obtained by a cyber-attack, which could enable a hacker to gain access to digitally held assets, amongst other things, associated with the private key. Often, this means that the private key is stored in a standalone computing device (for example, in memory in a computing device) that is completely disconnected from any external network.

Storing the keys in a cold environment means that the process of signing data, for example, signing a financial transaction, requires the data to be copied onto a portable storage device which is then taken into the cold environment and connected to the standalone computing hardware. Once signed, the data is taken back out of the cold environment on the portable storage device for publication online, for example, to a public blockchain. This end-to-end process is slow and cumbersome, and therefore impractical for most modern applications that are used for processing online payments. Likewise, to gain unauthorised access to these keys, a hacker or thief still only needs to attack one physical entity.

SUMMARY

The present disclosure relates to a system and method for providing secure access to an asset, for example, in the form of a cryptographic key needed to perform cryptographic operations, such as signing transactions of digital assets (e.g. an online financial transaction, transfer of a digital asset held on a blockchain), or any other secret or confidential information to which access is limited. The system makes use of three interrelated data objects; a policy object that defines access control rules, one or more vault objects that are linked to the policy object, and one or more assets that are linked to one of the vault objects. As such, the vault object can be considered analogous to an account in conventional banking applications, which is controlled by a policy and linked to one or more assets. The policy object and the assets are all created in a cold environment, with their integrity being protected using a key-based cryptographic technique such that any unauthorised changes will be cryptographically detectable. The associated cryptographic keys are stored within the cold environment. The vault object is created in an online environment, and in doing so avoids the expense or delay of cold storage processing. However, this does mean that the vault objects are not integrity protected using keys stored within the cold environment. Instead, a cryptographic hash is used to generate a vault ID, wherein specific data fields within the vault object are used as inputs to the hash function, including but not limited to data relating to the associated policy and customer. When assets are then created, they contain a reference to the vault ID. Consequently, if data within the vault object is tampered with, the vault ID calculated during an attempted transaction will be different to the original vault ID referenced in the asset(s), thereby orphaning the asset(s) from the tampered vault object, and preventing use of the asset.

One or more aspects of the present disclosure provide a system for providing secure access to a digital asset, the system comprising a first computing device operating in an offline environment, wherein the first computing device is configured to generate an access control object comprising at least an access control identifier associated with an access policy of a client, and a second computing device operating in an online environment, wherein the second computing device is configured to generate at least one vault object associated with the access control object, the vault object comprising a first dataset comprising at least the access control identifier, and a vault identifier, wherein the vault identifier is calculated in dependence on the first dataset, wherein the first computing device is further configured to generate at least one digital asset object associated with the vault object, the digital asset object comprising a digital asset and the vault identifier.

As such, the vault object is created in an online environment, and in doing so avoids the expense or delay of cold storage processing (i.e. in the offline environment). This allows multiple vault objects to be created for a user quickly and cost effectively, and thus enables vaults that are based on a pre-existing policy to be created in large batches, which is particularly beneficial in the context of a bank or financial organisation having a very large customer base, which may be in the millions. Furthermore, by using the data within the vault object to calculate the vault identifier and linking the resulting vault identifier to an asset object, any tampering with the data within the vault object will result in a different vault identifier being calculated during the authorisation process, which will orphan the asset from the tampered vault object and thus prevent the use of the asset.

The second computing device may be configured to calculate the vault identifier by inputting the first dataset to a hash function. This ensures that any unauthorised changes to the vault object will result in a different vault identifier being calculated during the authorisation process.

The first dataset may further comprise a client identifier uniquely identifying the client, and wherein the access control object may further comprise the client identifier.

The first computing device may be configured to integrity protect the access control object and/or the digital asset object using one or more integrity cryptographic keys stored in the offline environment. That is to say, the first computing device may use one or more cryptographic keys for implementing integrity protection mechanisms to thereby integrity protect the objects created in the offline environment. This ensures that any unauthorised changes to the access control object and asset object are cryptographically detectable.

The first computing device may be configured to apply a digital signature or hash-based message authentication code (HMAC) to the access control object. The first computing device may be further configured to encrypt the digital asset using an encryption key stored in the offline environment. For example, wherein the encryption may be an authenticated encryption process. This helps to ensure that contents of the the asset object remain confidential, as well as being integrity protected.

The digital asset may comprise a cryptographic key for digitally signing cryptographic operations. For example, the digital asset may be a private key for signing transactions of other digital assets, such as an online financial transaction or transfer of a digital asset held on a blockchain.

The access control object may further comprise the access policy associated with the client, wherein the access policy is indicative of one or more authorisation checks for using a digital asset associated with the client. For example, the one or more authorisation checks may be one or more authorisation signatures required to carry out any activity involving the digital asset.

The second computing device may be configured to generate a plurality of vault objects associated with the access control object. As such, once an access control object has been created for an object, any number of vault objects may be created for that access control object. As the vault object is created in the online environment, this can be done quickly and cheaply.

The first computing device may also be configured to generate a plurality of digital asset objects associated with the vault object.

The first computing device may be configured to authorise access to the digital asset contained in the digital asset object in dependence on the first dataset contained in the vault object.

In this respect, the first computing device may be further configured to receive (e.g. via an air-gap) a request for access to the digital asset, the request comprising data indicative of a result of one or more executed authorisation checks (e.g. data indicative of one or more signatures executed by authorised personnel), receive (e.g. via the air-gap) the vault object, calculate a verification identifier based on the first dataset of the received vault object, compare the verification identifier to the vault identifier of the digital asset object, verify that the vault object is associated with the access control object and digital asset object based on the comparison of the verification identifier and the vault identifier, and authorise access to the digital asset in dependence on the verifying.

For example, the vault object may be verified as being associated with the access control object and the digital asset object if the verification identifier matches the vault identifier.

The first computing device may be further configured to process the result of the one or more executed authorisation checks based on an access policy defined by the access control object, wherein the access policy is indicative of one or more authorisation checks for using the digital asset. For example, if the authorisation checks defined by the access policy require two authorisation signatures from a set of authorised personnel, the first computing device may check that the result indicates that the required authorisation signatures have been obtained. That is to say, the first computing device verifies the authorisation signatures.

The first computing device may be further configured to evaluate the integrity of the access control object and digital asset object using one or more integrity cryptographic key stored in the offline environment. That is to say, the first computing device will use the integrity keys used to integrity protect the access control object and the digital asset objection to detect whether their integrity has been corrupted.

The first computing device may be further configured to verify that the first dataset of the received vault object comprises the access control identifier associated with the access policy.

The verification identifier may also be calculated by inputting the first dataset of the received vault object to a hash function.

In cases where the digital asset comprises a cryptographic key for digitally signing cryptographic operations, the first computing device may be further configured to digitally sign a cryptographic operation using the cryptographic key of the digital asset object.

One or more additional aspects of the present disclosure provide an offline digital storage system for securely providing access to a digital asset, wherein the system comprises an offline digital storage device configured to receive a request to generate a digital asset associated with a client, wherein the request comprises a vault identifier associated with a vault object associated the client, wherein the vault identifier is calculated in dependence on a first dataset contained within the vault object, generate the digital asset, and generate a digital asset object, wherein the digital asset object at least comprises the digital asset and the vault identifier.

The vault identifier may be calculated by inputting the first dataset to a hash function.

The offline digital storage device may be further configured to receive a request to generate an access control object, wherein the request comprises an access policy associated with the client, the access policy defining one or more authorisation checks for using a digital asset associated with the client, generate an access control identifier associated with the access policy, and generate an access control object at least comprising the access control identifier and the access policy.

The first dataset may further comprise the access control identifier.

The offline digital storage device may be further configured to output the access control identifier to an online data storage device for use in generating one or more vault objects.

The offline digital storage device may be further configured to integrity protect the digital asset object and/or the access control object using one or more integrity cryptographic keys stored in the offline digital storage system.

The offline digital storage device may be configured to apply a digital signature or hash-based message authentication code (HMAC) to the access control object. The offline digital storage device may be configured to encrypt the digital asset using an encryption key stored in the offline digital storage system. For example, the encryption may be an authenticated encryption process. This helps to ensure that contents of the the asset object remain confidential, as well as being integrity protected.

The offline digital storage device may be further configured to receive (e.g. from a device in an online environment via an air-gap) a request for access to the digital asset, the request comprising data indicative of a result of one or more executed authorisation checks, receive the vault object associated with the digital asset (e.g. from the online environment), calculate a verification identifier based on the first dataset of the received vault object, compare the verification identifier to the vault identifier of the digital asset object, verify that the vault object is associated with the digital asset object based on the comparison of the verification identifier and the vault identifier, and authorise access to the digital asset in dependence on the verifying.

The verifying may further comprise verifying that the vault object is associated with the access control object.

The vault object may be verified as being associated with the access control object and the digital asset object if the verification identifier matches the vault identifier.

The digital asset may comprise a cryptographic key for performing cryptographic operations.

One or more additional aspects of the present disclosure provide an online digital storage system for use in controlling access to digital assets, wherein the system comprises an online digital storage device configured to receive, from a client device, a request to generate a vault object associated with an access control object, wherein the access control object comprises an access control identifier associated with an access policy defining one or more authorisation checks for using a digital asset associated with a client, generate the vault object, wherein the vault object comprises a first dataset comprising at least the access control identifier, calculate a vault identifier associated with the vault object, the vault identifier being calculated in dependence on the first dataset, and output, to a data storage means, the vault object and vault identifier for use in controlling access to one or more digital assets.

The vault identifier may be calculated by inputting the first dataset to a hash function.

The first dataset further may further comprise a client identifier uniquely identifying the client.

One or more additional aspects of the present disclosure provide a computer-implemented method of generating data objects for use in controlling access to a digital asset, the method comprising generating an access control object comprising at least an access control identifier associated with an access policy of a client, the access control object being generated within a secure offline environment, generating at least one vault object associated with the access control object, the vault object comprising, a first dataset comprising at least the access control identifier, and a vault identifier associated therewith, wherein the vault identifier is calculated in dependence on the first dataset, the vault object being generated within an online environment, and generating at least one digital asset object associated with the vault object, the digital asset object comprising at least one digital asset and the vault identifier, the digital asset object being generated within the secure offline environment.

In some cases, the access control object may be integrity protected using an integrity cryptographic key stored in the offline environment, and the digital asset object may also be integrity protected and encrypted, for example, using authenticated encryption, using an encryption key stored in the offline environment.

The digital asset may also comprise a cryptographic key for digitally signing cryptographic operation.

Also provided is a computer program configured to perform the method described above when executed on one or more processors.

BRIEF DESCRIPTION OF THE DRAWINGS

Further features and advantages will become apparent from the following description of embodiments thereof, presented by way of example only, and by reference to the drawings, wherein.

DETAILED DESCRIPTION

The present disclosure relates to a system and method for providing secure access to an asset, for example, in the form of a cryptographic key needed to perform cryptographic operations, such as signing transactions (e.g. an online financial transaction or transfer of a digital asset held on a blockchain), or any other secret or confidential information to which access is limited. The system makes use of three interrelated data objects; a policy object that defines access control rules, one or more online vault objects that are linked to the policy object, and one or more asset objects that are linked to one of the vault objects. A vault object is linked to the policy object in that the data fields within the vault object contain a policy ID associated with the policy object, and a customer ID associated with the customer (i.e. the owner of the vault object and assets). An asset object is then linked to a vault object in that it contains a vault ID associated with the vault object, the vault ID being generated from a cryptographic hash of the vault object's content. In this respect, data such as the policy ID and customer ID are used as inputs to the hash function.

The policy object and the asset objects are all created in a cold environment (i.e. an offline environment), with their integrity being protected using a key-based cryptographic technique, including but not limited to a digital signature (using any suitable signature algorithm), hash-based message authentication code (HMAC) or authenticated encryption, with the associated cryptographic keys being stored within the cold environment. As such, any unauthorised changes will be cryptographically detectable by processing means within the cold environment.

The vault object is created in an online environment, and in doing so avoids the expense or delay of cold storage processing. This allows multiple vault objects to be created for a user quickly and cost effectively. For example, the user may require different vault objects associated with different banking entities or blockchains. This therefore enables vaults that are based on a pre-existing policy to be created in large batches, which is particularly beneficial in the context of a bank or financial organisation having a very large customer base, which may be in the millions. However, this does mean that the vaults objects are not integrity protected using keys that are stored in the cold environment, and thus any tampering with the data in the vault object will not themselves be cryptographically detectable. Instead, by using the data within the vault object as inputs to the cryptographic hash function and linking the resulting vault ID to an asset, any tampering with the data within the vault object will result in a different vault ID being calculated during a transaction authorisation process, which will orphan the asset from the tampered vault object and thus prevent the use of the asset.

To complete a cryptographic operation using the asset object or use the digital asset contained within the asset object in some way, such as the signing of a transaction using a cryptographic key, the integrity and interlinkage of the policy object, the vault object and the asset object are all cryptographically verified in the cold environment. As discussed above, the integrity of the policy object and asset object can be verified using the associated cryptographic keys stored in the cold environment. To verify the integrity of the vault object and the interlinkage between the three data object, a calculation of the vault ID from its constituent fields is performed. If the calculated hash matches the original vault ID referenced in the asset object, then the integrity of the vault object and its interlinkage with the asset object can be verified. Similarly, if the policy ID contained within the vault object matches that contained in the policy object, then the link between the vault object and the policy object is also verified. If all of the verification checks are successful, then the cryptographic operation will be carried out using the cryptographic key contained within the asset object. If any of the values do not match, then the cryptographic operation will not be authorised.

The use of the vault objects created in an online environment also helps to simply the execution of transactions involving certain types of digital assets, for example, cryptocurrencies such as Bitcoin. For simplicity, the transaction request preferably includes an instructions that says transfer X amount from source Y to destination Z. For many types of digital assets, there is single blockchain address that represents Y, however, for other types such as Bitcoin, the customer's assets consist of a collection of "unspent transaction outputs" (UTXOs) and so there is no single Y address. Instead, there are a collection of ever changing Y addresses. As described herein, the vault object acts as a proxy to address Y, so that the customer has a single reference to "send from" within their transaction, without needing to keep track of all the actual UTXOs that will in reality form the Y when executing the actual blockchain transaction. As such, in certain applications the vault objects also help to simplify the processing involved in order to carry out transactions.

Figure 1:
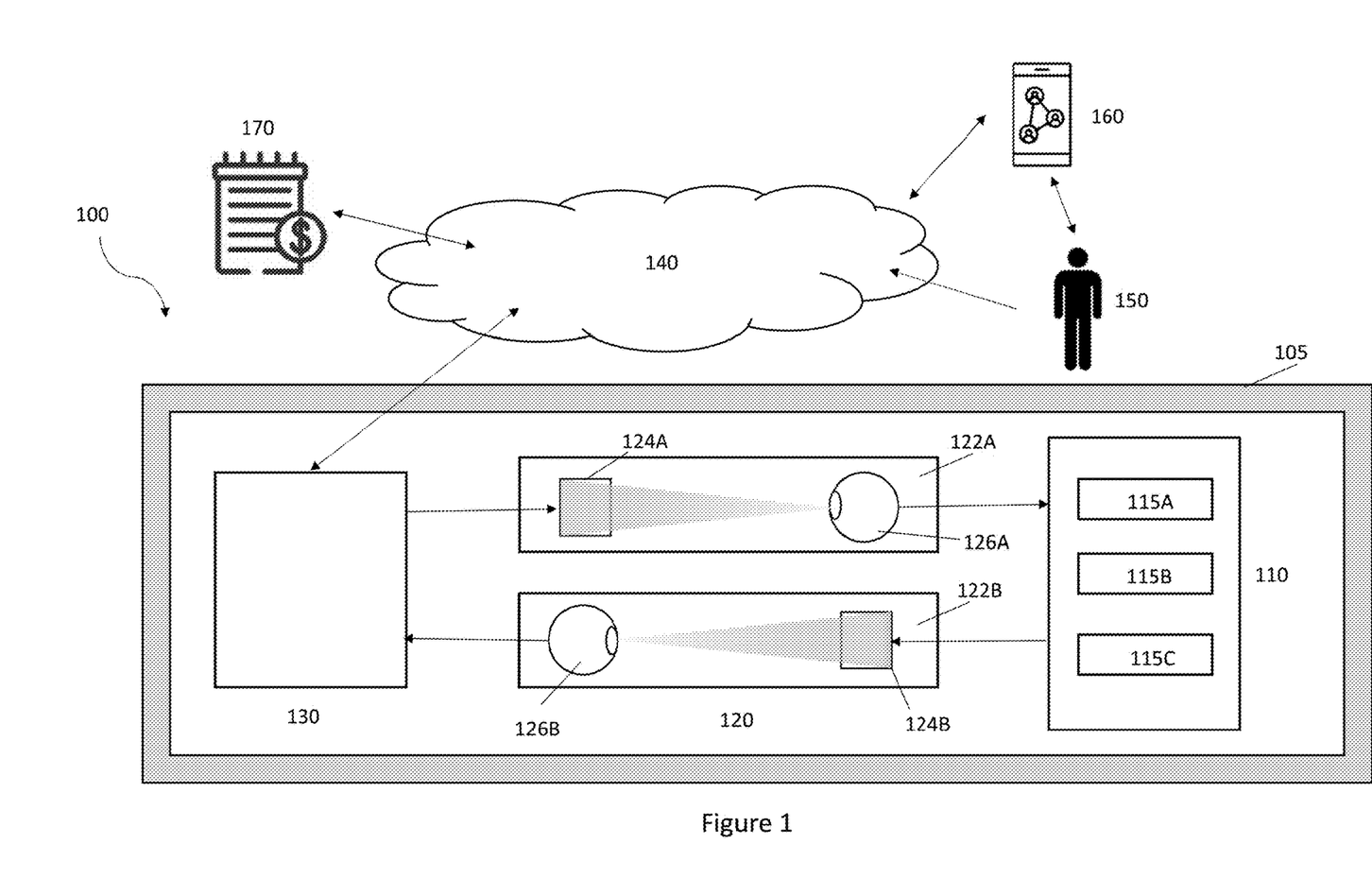
FIG. 1 is a block diagram illustrating a system according to one or more illustrative aspects described herein.

FIG. 1 shows an example schematic representation of a system 100 in accordance with the present disclosure.

The system 100 may comprise one or more digital storage device 110 that are located in a cold environment, which in this particular example is a hardware security module (HSM) 110. The HSM 110 is configured to securely store one or more cryptographic keys and other information associated therewith, as will be described in more detail below. The HSM 110 is also configured to perform other functions such as the creation of policy objects for defining access to a digital asset, as well as other encryption and decryption functions, as will become apparent from the following description. Optionally, each HSM 110 may be subdivided, for example, by means of a plurality of processing means 115A, 115B and 115C so that multiple different master keys may be logically segregated and therefore held securely and independently. The HSM 110 may also comprise a smartcard reader (not shown), or some other interface, used for back-up and restoration of objects in the event that an object stored on the HSM 110 is deleted, for example, upon identification of a security breach.

The system 100 further comprises an interface device 130 and a data transmission system 120. As will be described further below, this will terminate any network connection with the HSM 110 to thereby create a cold environment. It will be appreciated that any apparatus suitable for providing an air gap (i.e., a break in network connection) may be used. In this non-limiting example, the data transmission system 120 comprises a data diode arrangement that only allows data to travel in one direction (although data diodes are not essential for achieving a break in network connection). In this example, the data transmission system 120 comprises at least two data diodes 122A and 122B that each enable data flow in one particular direction. The first data diode 122A is configured for the transfer of data from the interface device 130 to the HSM 110 (i.e. data flow into the HSM 110 only), whilst the second data diode 122B is configured for the transfer of data from the HSM 110 to the interface device 130 (i.e. data flow out of the HSM 110 only). The term 'diode' is used herein to indicate one way data communication. In this particular example, each data diode 122A, 122B comprises a transmitter 124A, 124B and a receiver 126A, 126B. For example, the transmitter 124A may be an optical light source such as a light emitting diode (LED) for generating an optical signal indicative of the data to be transmitted to the HSM 110, whilst the transmitter 124B may be an optical light source such as an optical display for generating an optical signal in the form of a unique barcode such as a QR code. The receiver 126A, 126B may then be implemented as an optical device 126A, 126B, such as a photodiode or camera, for receiving the light transmitted or displayed at the transmitter 124A, 124B and thereby receiving the transmitted data. In doing so, the data diode 122A for transmitting data from the HSM 110 may have more communication flexibility than the data diode 122B since the HSM 110 is a secure and trusted device, whilst the data that can be transmitted via data diode 122B may be more constrained in order to control what data is received at the HSM 110 and ensure that the HSM 110 does not receive malicious or corrupted data. In such cases, it will be appreciated that the optical light sources 124A, 124B may include some sort of processing means for encoding the data using the data transfer protocol, and likewise the optical devices 126A, 126B may include some sort of processing means for decoding the received data. As such, this arrangement provides one way of ensuring that there is no network connection between a sender (i.e., in the online environment) and the receiving device on the air gapped side, such that the HSM 110 exists within a cold environment.

It will however be appreciated that the data transmission system 120 may be implemented in any suitable way, using any means suitable for providing one way data communication, for example, through fiber optic cables or the like, so as to create a cold environment through the provision of an air gap.

The interface device 130 for receiving data from or inputting data to the data transmission system 120 may be connected to an online network 140 (which in this particular example is a cloud network 140) via any suitable connection comprising wired or wireless means.

As such, only the interface device 130 is network terminated, whether connected to a closed network or otherwise, and thus it is only on the side of the interface device 130 that there is any network connection to the data transmission system 120. The HSM 110 is thus on the air gapped side of the data transmission system 120 where there is no network connection. That is to say, the HSM 110 is in a cold environment, whilst everything on the other side of the data transmission system 120 is in an online environment. It will also be appreciated that the cold environment may also comprise other processing and storage means (not shown), which may be used alongside the HSM 110 to carry out the methods described herein.

The HSM 110, data transmission system 120 and interface 130 may all be further housed within a secure storage facility 105, such as a vault or bunker, as an added layer of physical security.

A user 150 of the system may communicate with the cloud network 140 using any suitable client computing device (for example, a desktop computer, smart phone, tablet, etc.), either directly (for example via the internet, or any other suitable communications network/means) or via some other third-party system 160. The user 150 may, amongst other things, request the generation of an asset object (e.g. in the form of a cryptographic key), and subsequently make use of the asset object for carrying out cryptographic operations, for example signing electronic data/objects such as transactions of digital assets, which may in turn be recorded in an external ledger 170.

Figure 2:
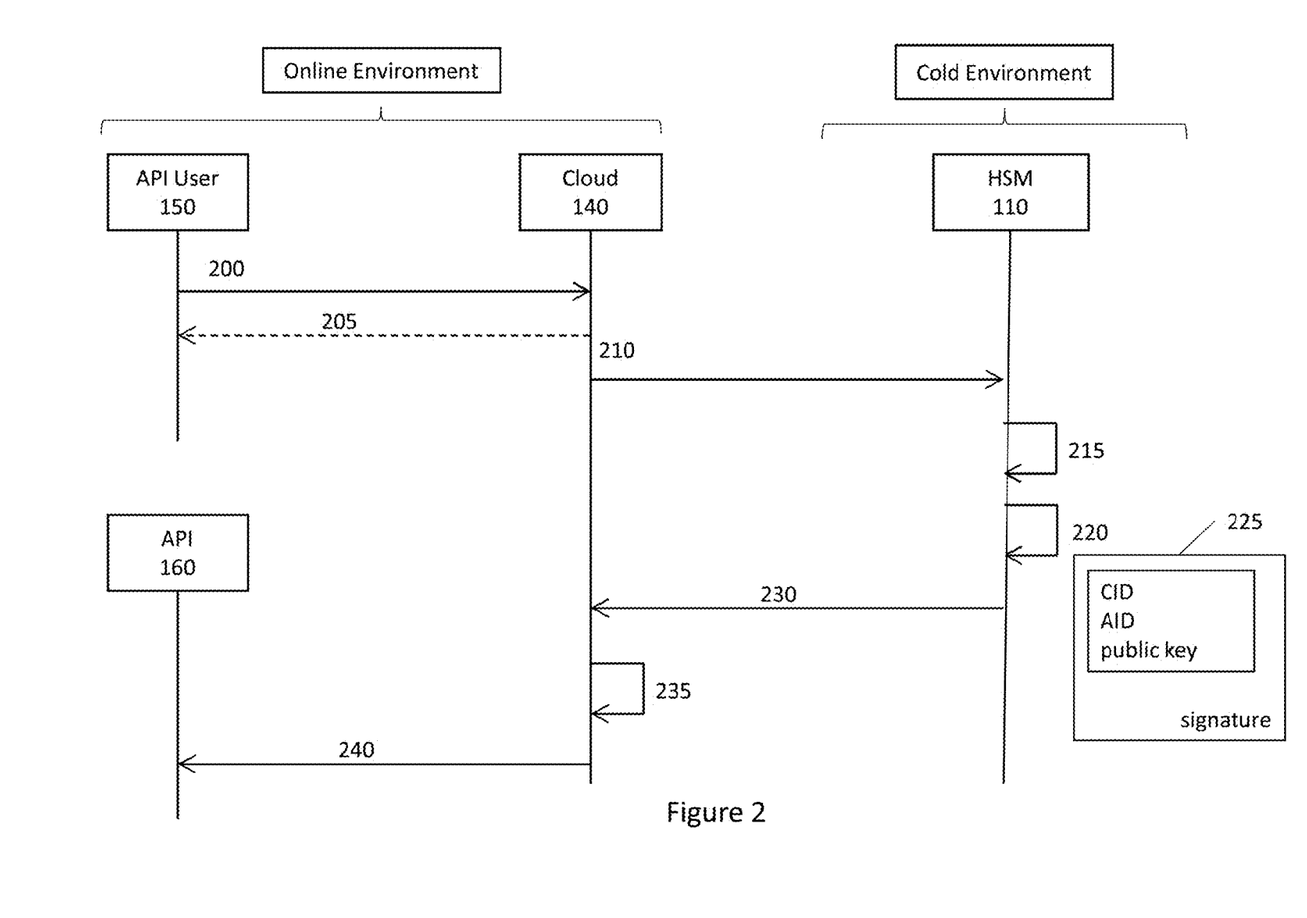
FIG. 2 is an example sequence diagram of communications between some of the entities represented in FIG. 1.

FIG. 2 shows an example process by which the system 100 may first be used to create an authoriser object associated with a user 150.

In a first step 200, the user 150 sends a request to a service provider (e.g. application programming interface (API) 160) via the cloud network 140 to create an authoriser object for use in authorising future transactions. The request will include details of a public key that is part of a public-private key pair that has been generated using any suitable asymmetric cryptographic algorithm. The private key of the key pair is held by the user 150 and will be used by the user 150 to authorise transactions involving their assets. Upon receipt of the request, a notification will be sent back to the user 150 at step 205 to confirm that the request has been received and accepted.

At step 210, the request is sent from the online environment to the cold environment for processing. That is to say, the request is sent to the HSM 110 via interface device 130 and the data transmission system 120. In this respect, the data will be sent to the interface device 130 and then across the data transmission system 120 to the HSM 110. For example, the interface device 130 inputs the data to the transmitter 124A of the data diode 122A, where it is then observed by the receiver 126A. This data will then be received at the HSM 110 for processing. The request includes the public key associated with the user 150, as well as a customer ID for the user 150. Upon receiving the request from the user 150, an existing customer ID may be extracted from storage by the service provider API 160, or alternatively, in the case of a new customer, the service provider API 160 may generate a new customer ID.

At step 215, once the HSM 110 has received the data, the HSM 110 generates a random authoriser ID, and at step 220, creates an integrity protected authoriser object 225 comprising data fields containing the customer ID, the authoriser ID and the user's public key. The HSM 110 then applies a key-based integrity protection mechanism, for example, a digital signature (using any suitable signature algorithm) or hash-based message authentication code (HMAC), to the authoriser object 225 using a key that is stored in the HSM 110 and used to integrity protect objects requiring protection that are created within the HSM 110, as will be described in more detail below. At step 230, the integrity protected authoriser object 225 is then sent back to the online environment via the transmission system 120. The integrity protected authoriser object 225 may then be stored at the cloud network 140 (step 235), as well as being sent to the service provider API 160 (step 240).

Figure 3:
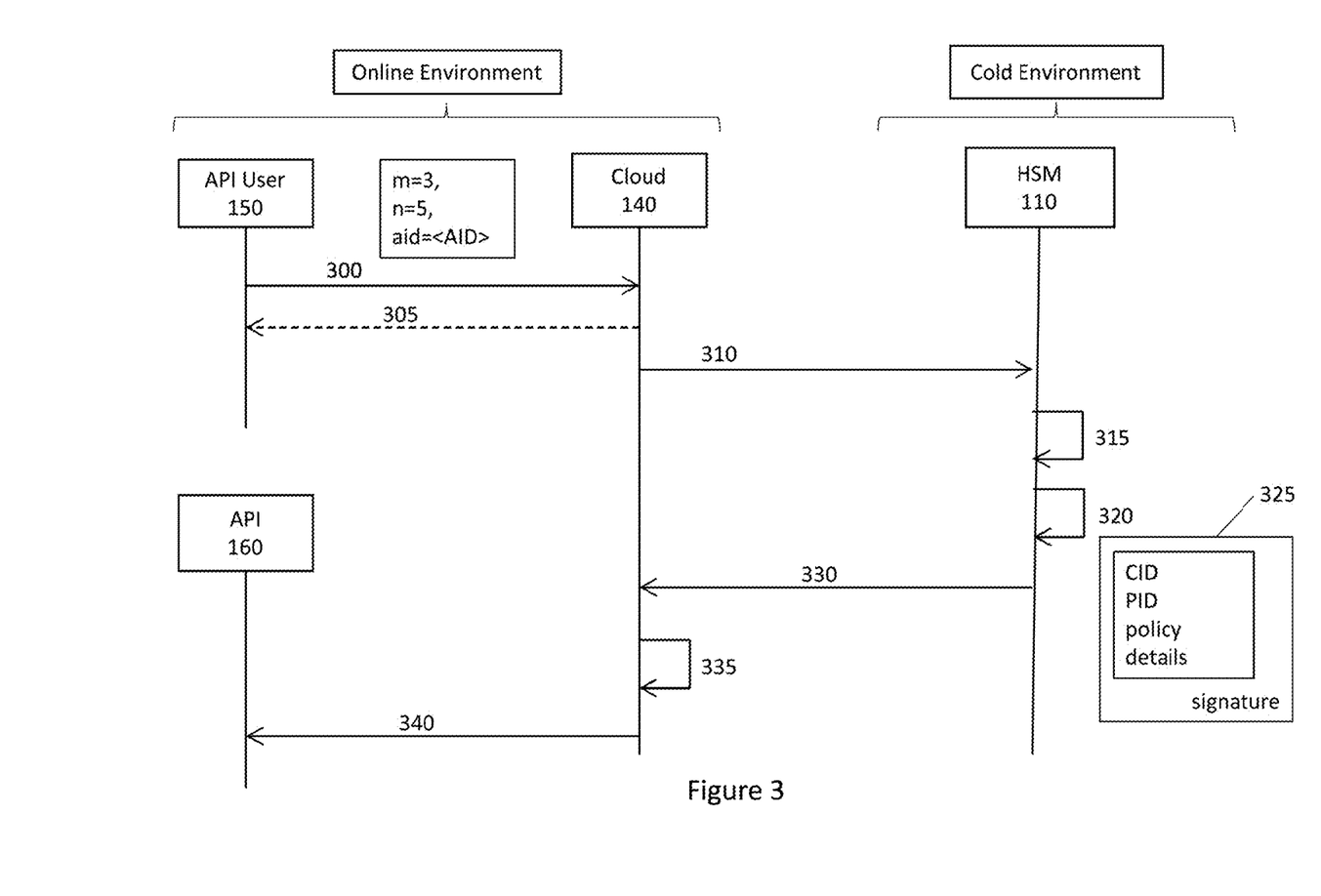
FIG. 3 is a further example sequence diagram of communications between some of the entities represented in FIG. 1.

FIG. 3 shows an example process by which the system 100 may first be used to generate a policy object associated with the authorised user 150, wherein the policy object is created in the cold environment. The policy will define a set of rules that allow an authorised user to obtain access to any assets, or other secret entity or object, associated with or belonging to the user 150. For example, the asset may be the cryptographic key for carrying out cryptographic operations, including but not limited to signing electronic data/objects such as transactions of digital assets.

At step 300, a user 150 requests the creation of a policy, for example, via the service provider API 160, wherein the policy provides details of one or more authorisation checks (for example, two or three authorisation signatures) needed to authorise subsequent use of an asset associated with the user 150, including the form of the authorisation checks needed to complete those authorisation checks. It will of course be appreciated that any number and combination of suitable authorisation checks may be implemented, which may be defined by the user 150, or the third party operating the API 160 through which the request is being made.

The policy details are sent to the cloud network 140 with a request to create a policy object, which includes the number of authorisers, n, associated with the policy (denoted m), the number of signatures, m, needed to successfully authorise a transaction, and the authoriser IDs associated with the authorisers. In this respect, the authoriser IDs may be created for each of the authorisers as described with reference to FIG. 2. For example, there may be five authorisers (n=5) associated with a particular policy, wherein signatures from three of the five authorisers (m=3) are needed to successfully authorise a transaction. It will however be appreciated that n and m may be any integer value. When the policy details are received at the cloud network 140, a message confirming the request is sent back to the user 150 (step 305). At step 310, the cloud network 140 will then extract the customer ID associated with the user 150 and send the policy details and customer ID to the cold environment for processing. That is to say, the policy details and customer ID are sent to the HSM 110 via interface device 130 and the data transmission system 120.

At step 315, the HSM 110 creates a random policy ID for the policy using any suitable method. A policy object 325 is then created at step 320, the data fields of which comprise the customer ID, the policy ID and the policy details (i.e., details of the authorisers and the authorisation checks required). This policy object 325 is then integrity protected using any suitable key-based integrity protection technique, including but not limited to a digital signature (using any suitable signature algorithm) or a HMAC. As such, the policy object 325 is created in a secure cold environment and is integrity protected to make it tamper evident. That is to say, any unauthorised changes to the content of the policy object 325 will be cryptographically detectable within the HSM 110 using the integrity key stored in the HSM 110.

At step 330, the integrity protected policy object 325 is sent back across the air gap to the online environment (e.g., via the transmission system 120). The integrity protected policy object 325 may then be stored at the cloud network 140 (step 335), as well as being sent to the service provider API 160 (step 340). It will of course be appreciated that the policy object 325 may also be stored within the HSM 110 or on some other storage means within the cold environment, as well as or instead of storing the policy object 325 in the online environment defined by the cloud network 140 and service provider API 160. In cases, where the policy object 325 is only stored within the cold environment, a notification message will be sent to the cloud network 140 and service provider API 160 at steps 330 and 340 to communicate that the policy object 325 has been successfully created and stored, the notification message also containing the policy ID for future use, as will be described below.

Advantageously, a single policy object 325 may be generated for each user 150, such that only one iteration of cold storage processing is required.

Figure 4:
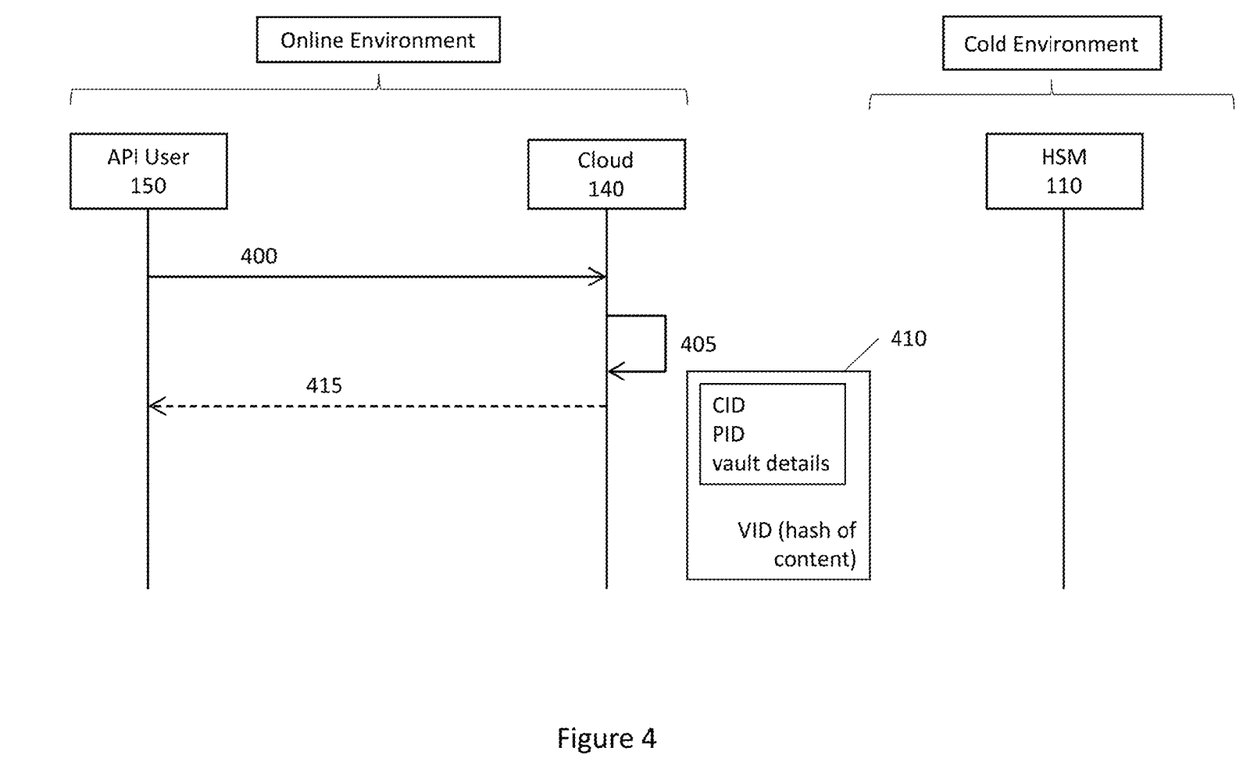
FIG. 4 is a further example sequence diagram of communications between some of the entities represented in FIG. 1.

FIG. 4 shows an example process by which the system 100 may be used to create a vault associated with the policy of a particular authorised user in the online environment, which may then be linked to one or more asset objects associated with the user.

At step 400, the user 150 sends a request to the cloud network 140 to create a vault, for example, via the service provider API 160. The request includes the policy ID created in step 315, the customer ID and any other details associated with the vault, such as the types of asset(s) to which it is to be linked (e.g. a bank account or a digital asset held on a blockchain), and a name or reference for the vault provided by the customer (e.g. the owner of the vault, or a bank or financial organisation managing the vault for the owner). In this respect, it will be appreciated that some of the data included in the request may be input by the user 150, whilst other data is extracted from information stored by the API 160.

At step 405, a vault object 410 is created within the cloud network 140. That is say, the vault object 410 is created outside of the cold environment (e.g. the HSM 110). By generating the vault object 410 outside of the cold environment, one or more vault objects 410 can be created without incurring the expense or delay associated with the cold environment processing. As such, multiple vault objects 410 can be quickly and cheaply created in connection to a particular user 150 and their associated access policy 325. For example, a user 150 may wish to create different vaults 410 associated with different banking entities or blockchains, with each vault 410 then being linked to one or more assets associated with those entities (e.g. different accounts). As such, this enables large scale numbers of vault objects to be created quickly and cheaply.

The vault object 410 includes the customer ID associated with the user 150, the policy ID and the details of the vault. A cryptographic hash is calculated using at least the policy ID and customer ID as inputs to thereby provide a vault ID. As such, the vault object 410 does not use a key-based integrity protection technique to protect its integrity, and so the contents of the vault object 410 could be changed by a malicious attack, and the change itself would not be detectable. However, as will be discussed in more detail below, the nature of the vault ID is such that any attack on the vault object 410 would not result in a successful attack of any asset or asset object associated with said vault 410.

Once the vault object 410 has been created, a confirmation may be sent back to the user 150 at step 415, which may include the vault object 410.

Figure 5:
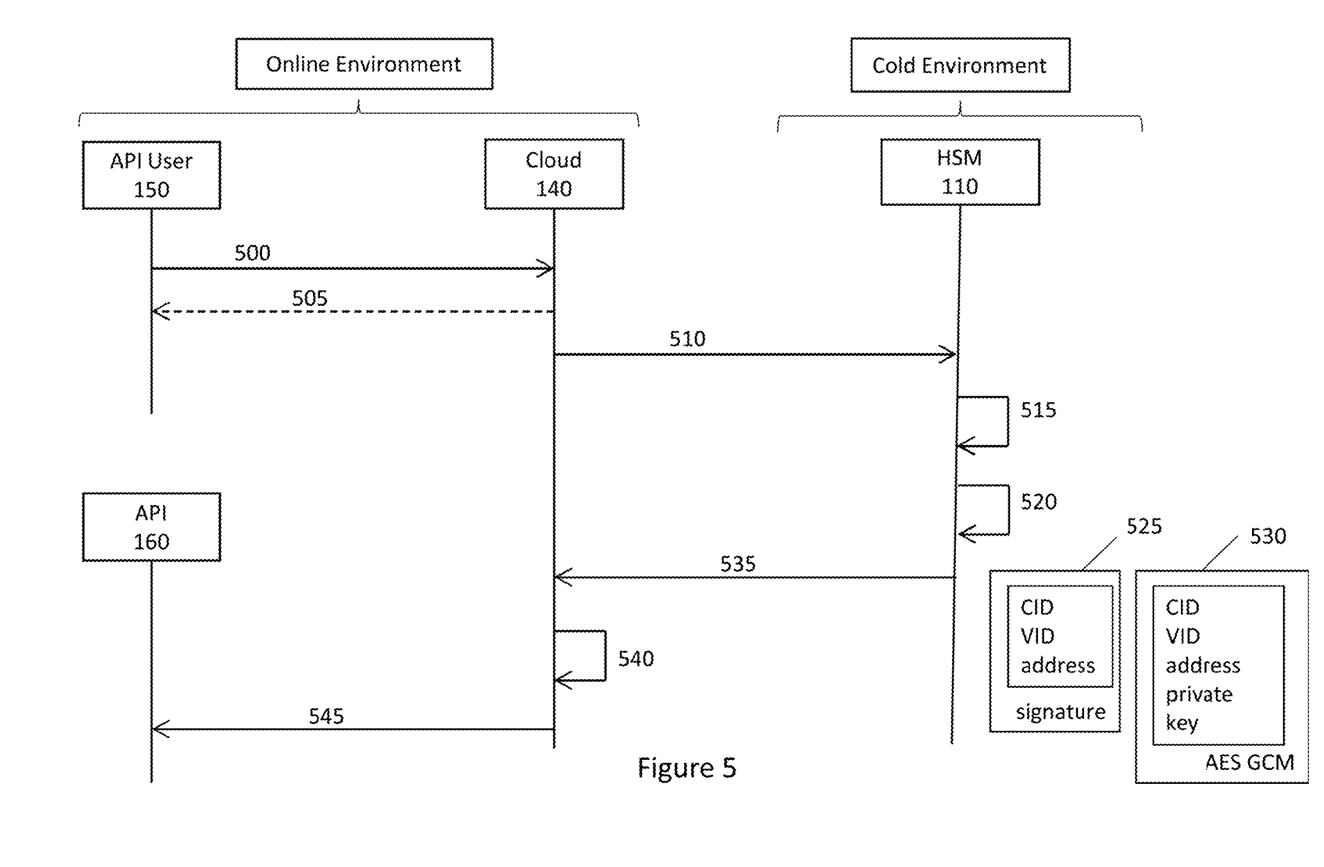
FIG. 5 is a further example sequence diagram of communications between some of the entities represented in FIG. 1.

FIG. 5 shows an example process by which the system 100 may be used to create an asset object, such as a cryptographic key, associated with and thus protected by the vault object 410, wherein the asset object is created in the cold environment.

At step 500, the user 150 sends a request to the cloud network 140 to create an integrity protected asset object. For example, the request may be to generate a cryptographic private key, which is to be used for signing digital transactions. The request includes the vault ID of the vault object 410 that is to be used to protect the asset object, as well as details of the asset object that is to be created (e.g. a digital asset in the form of private-public key pair). For example, the request may include data indicating that a private-public key pair should be created for use in a particular blockchain, such as the Ethereum or Bitcoin blockchain Upon receipt of the request, a notification is sent back to the user 150 at step 505 to confirm that the request has been received and accepted.

At step 510, the request is sent to the cold environment for processing. That is to say, the request is sent to the HSM 110 via interface device 130 and the data transmission system 120. Once the request has been received by a part of the HSM 110, a cryptographic key is generated at random at step 515, along with an associated address. The cryptographic key may be a private key generated as a private-public key pair using any suitable asymmetric cryptographic algorithm. The cryptographic key may be suitable for any type of cryptographic operation, for example encrypting data, digitally signing data, hashing data, etc. The associated address is typically a value derived from the public key of the private-public key pair. For example, in the context of a blockchain, the address provides an identifier used on the blockchain to denote the owner of some amount of a digital asset (e.g. crypto-currency). The owner can send a transaction to the blockchain to transfer ownership of the digital asset by signing that transaction using the private key relating to the public key that was used to derive the address.

Alternatively, the cryptographic key may be a symmetric secret key, in which case an address may not be derived.

At step 520, an address object 525 and an asset object 530 is generated based on the address and cryptographic key pair generated at step 515. The address object 525 comprises the customer ID, the vault ID and the address, which are cryptographically bound using some suitable key-based cryptographic integrity protection mechanism. The asset object 530 has data fields comprising the customer ID, the vault ID, the address and the cryptographic private key, which are also integrity protected using some suitable key-based cryptographic technique such as authenticated encryption. For example, the HSM 110 may use the AES-GCM mode of authenticated encryption. As with the policy object 325, the asset object 530 is created in a secure cold environment, but is encrypted as well as being integrity protected to make it tamper evident. As such, the asset object 530 and its contents are encrypted to provide a first layer of protection and integrity protected, such that any unauthorised changes to the content of the asset object 530 will be cryptographically detectable within the HSM 110. In this respect, the HSM 110 will use and store a specific key for encrypting and decrypting the asset object 530. If the data within the asset object 530 has been modified, the decryption process will fail.

At step 535, the integrity protected address object 525 and encrypted asset object 530 are sent back across the data transmission system 120 to the interface device 130, and then sent to the cloud network 140. The integrity protected address object 525 and asset object 530 may then be stored at the cloud network 140 (step 540), as well as being sent to the service provider API 160 (step 545). It will of course be appreciated that the asset object 530 may be stored within the cold environment, as well as or instead of storing the asset object 530 in the online environment defined by the cloud network 140 and service provider API 160. In cases, where the asset object 530 is only stored in the cold environment, a notification message will be sent to the cloud network 140 and service provider API 160 at steps 535 and 540 to communicate that the asset object 530 has been successfully created and stored.

Figure 6:
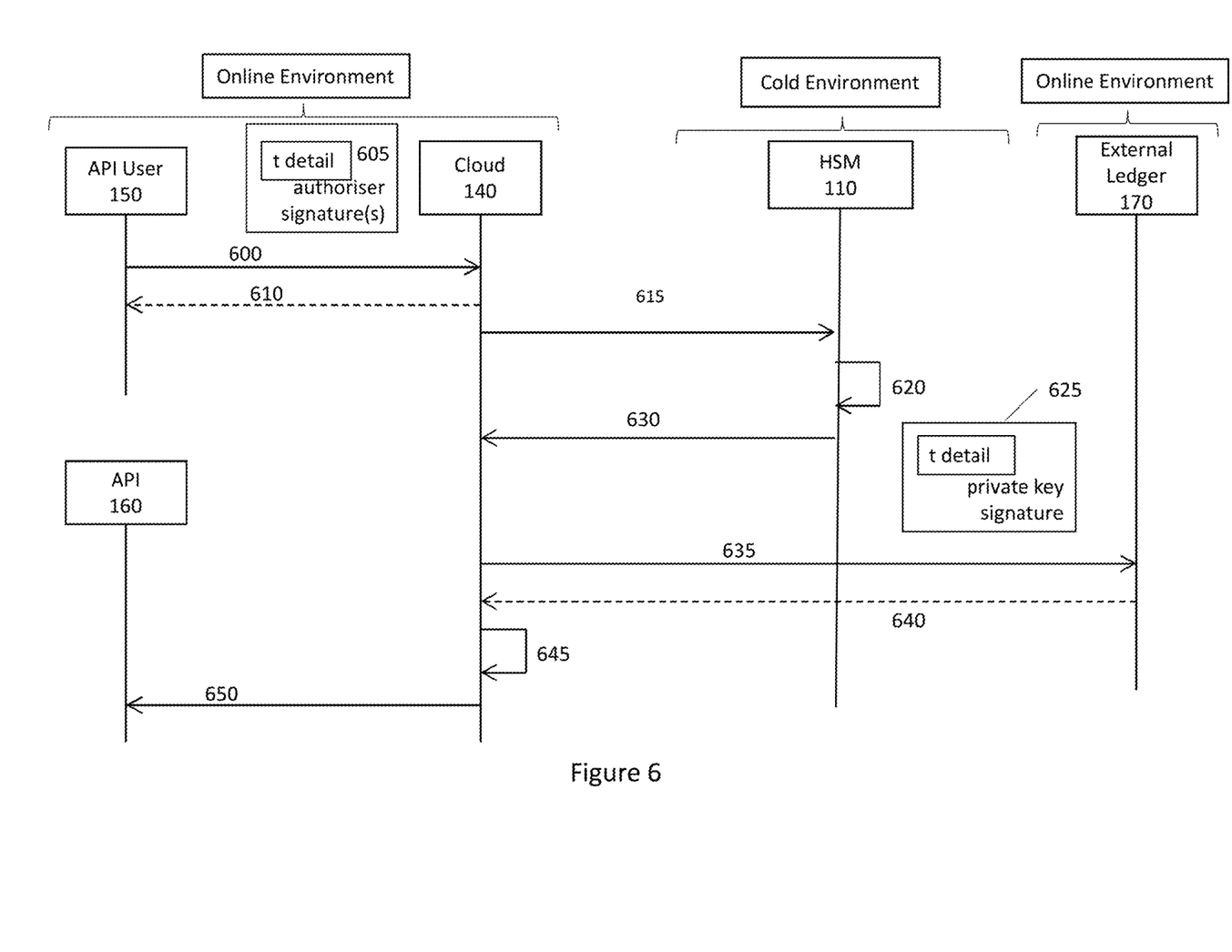
FIG. 6 is a further example sequence diagram of communications between some of the entities represented in FIG. 1.

FIG. 6 shows an example process by which the system 100 may first be used to perform a cryptographic operation such as a transaction using the integrity protected asset object 530, vault object 410 and integrity protected policy object 325.

At step 600, the user 150 initiates a transaction request 605 relating to an asset (e.g. a bank account or digital asset held on a blockchain) that is associated with the user 150, for example, via the service provider API 160. The transaction request 605 comprises the details of the transaction that is being requested (for example, a transfer of assets to another entity), along with any authoriser signatures of the person(s) authorising the transaction (e.g. any other persons identified in the policy object 325). In this respect, the transaction will be authorised by the authorising person(s) using the private key corresponding to the public key stored within the authoriser objects 225 created for each of the relevant people. Once the transaction request 605 has been received at the cloud network 140, a notification is sent back to the user 150 at step 610 to confirm that the request has been received and accepted.

At step 615, the cloud network 140 then transmits this transaction request 605, along with the authoriser object 225, the integrity protected policy object 325, the vault object 410 and the encrypted and integrity protected asset object 530 to the cold environment for processing, that is, to the HSM 110, via interface device 130 and the data transmission system 120. Alternatively, in cases where the policy object 325 and asset object 530 are stored within the cold environment, the HSM 110 may extract these objects upon receipt of the transaction request 605, the authoriser object 225 and the vault object 410.

Once received at the HSM 110, the integrity keys used to integrity protect each of the integrity protected objects (i.e. the authoriser object 225, the policy object 325, and the asset object 530) are used to evaluate the integrity of the contents of those objects. Any tampering of those objects will thus be detectable by the HSM 110, in which case the transaction will not be authorised and signed.

To verify the transaction the HSM 110 will first calculate a vault ID using at least a portion of the data fields within the vault object 410, in particular, the policy ID, as well as the customer ID and the vault name or reference, as inputs to a hash function of the contents of the vault object 410, and compares this to the original vault ID contained within the asset object 530. If the two values match (i.e. the vault object 410 has not been tampered with), the HSM 110 verifies that the policy ID in the vault object 410 matches that in the policy object 325, thus confirming that the received policy object 325 is the legitimate policy relating to the asset object 530. Once the integrity and interlinkage of the policy object 325, the vault object 410 and the asset object 530 has been verified, and the authoriser signatures on the transaction can be verified according to the access rules specified by the policy object 325 and the relevant authoriser objects 225, the transaction 625 is signed at step 620. Here, the transaction 625 is digitally signed using the cryptographic private key associated with the asset object 530.

Conversely, in the event that the vault object 410 has been tampered with, for example, an attacker has changed the customer ID within the vault object 410 with aim of changing the authorised user, or the policy ID within the vault object 410 with the aim of changing the policy and the authorisation checks associated therewith, the change in itself would not be cryptographically detectable by the HSM 110. However, because the vault ID is a cryptographic hash of the contents of the vault object 410, changing any data in the vault object 410 results in a different vault ID being calculated by the HSM 110. Consequently, the calculated vault ID does not match the original vault ID contained in the asset object 530, thereby orphaning the vault object 410 from the asset object 530. If the values do not match, the HSM 110 will not authorise the use of the private key within the asset object 530 to sign the transaction, thus preventing the attacker from accessing the assets associated with the transaction. As such, by linking the contents of the vault object 410 to the contents of the asset object 530 and the policy object 325, the vault object 410 can be created without the delay and cost of cold storage processing, whilst still ensuring the security of the assets it is protecting. Moreover, multiple asset objects 530 can be easily linked to a vault object 410 using the vault ID, which is considerably less expensive and time intensive than the use of vaults within a cold storage system.

At step 630, the signed transaction 625 is sent back across the data transmission system 120 and the interface device 130, and transmitted to the cloud network 140. Once received, the signed transaction 625 may be sent to an external ledger 170 or the like at step 635, where the transaction takes place. For example, in the case of signing a blockchain transaction relating to the transfer of a digital asset held on a blockchain, the signed transaction may be broadcast to nodes participating in the blockchain to order to complete the transfer. Alternatively, in the case of a traditional signed financial transaction, it may be forwarded to the bank making the transaction. Once completed, a confirmation that the transaction has been completed is sent back to the cloud network 140 at step 640, where a record of the completed transaction may be stored (step 645). A status update is then sent back to the service provider API 160 to confirm that the transaction has taken place, so that any records (e.g. a bank balance) can be updated accordingly.

Various modifications, whether by way of addition, deletion and/or substitution, may be made to all of the above described embodiments to provide further embodiments, any and/or all of which are intended to be encompassed by the appended claims.

For example, in the above description, a data transmission system 120 is used such that the HSM 110, and anything placed behind it, sits within a cold environment (i.e., there is an air gap between the HSM 110 and any outside devices), and the HSM 110 is housed within a physically secure location 105. However, any digital storage device that is in a cold environment and configured to perform the operations described above may be used.

In the above description, communications between the interface device 130 and the cloud network 140 use a 'closed' connection/network, which may be beneficial for enhancing the security of those communications. However, in an alternative, any suitable form of data connection may be used. Furthermore, the interface device 130 may be omitted entirely and the cloud network 140 may interface directly with the air gapped data transmission system 120, for example, via the data diodes 122A and 122B.

In the above description, the storage facility 105 comprises a single HSM 110 with a plurality of processing means 115A-C, each processing means storing logically separated cryptographic keys. However, in an alternative, a single HSM 110 with a single processing means may be provided and may be configured to store one or more cryptographic keys. In a further example, the storage facility 105 may comprise a plurality of HSMs 110, which may each be configured to store one master key, or alternatively, a plurality of cryptographic keys.

In the above description, the same service provider API 160 is used to perform the methods described with reference to FIGS. 2 to 5. However, it will be appreciated that APIs associated with different third parties may be used by the user 150 to request the creation of the authoriser object 325, the policy object 325, the vault object 410, the address object 525 and the asset object 530.

The aspects of the present disclosure described in all of the above may be implemented by software, hardware or a combination of software and hardware. For example, the functionality of the HSM and the functionality of the cloud network 140 may be implemented by software comprising computer readable code, which when executed on the processor of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way.

The invention claimed is:

1. A system for providing secure access to a digital asset, the system comprising:
a first computing device operating in an offline environment, wherein the first computing device comprises a memory and is configured to generate an access control object comprising at least an access control identifier associated with an access policy of a client; and
a second computing device operating in an online environment, wherein the second computing device comprises a memory and is configured to generate at least one vault object associated with the access control object, the vault object comprising:
a first dataset comprising at least the access control identifier; and
a vault identifier, wherein the vault identifier is calculated in dependence on the first dataset;
wherein the first computing device is further configured to: generate at least one digital asset object associated with the vault object, the digital asset object comprising a digital asset and the vault identifier; receive a request for access to the digital asset, the request comprising data indicative of a result of one or more executed authorization checks; calculate a verification identifier based on the first dataset of the vault object; verify that the vault object is associated with the access control object and digital asset object based on a comparison of the verification identifier and the vault identifier; and authorize access to the digital asset in dependence on the verifying.

2. A system according to claim 1, wherein the second computing device is further configured to calculate the vault identifier by inputting the first dataset to a hash function.

3. A system according to claim 1, wherein the first dataset further comprises a client identifier uniquely identifying the client.

4. A system according to claim 3, wherein the access control object further comprises the client identifier.

5. A system according to claim 1, wherein the first computing device is configured to integrity protect the access control object and/or the digital asset object using one or more integrity cryptographic keys stored in the offline environment, wherein the first computing device is optionally configured to apply a digital signature or hash-based message authentication code (HMAC) to the access control object.

6. A system according to claim 5, wherein the first computing device is further configured to encrypt the digital asset using an encryption key stored in the offline environment, wherein the encryption is optionally an authenticated encryption process.

7. A system according to claim 1, wherein the digital asset comprises a cryptographic key for digitally signing cryptographic operations.

8. A system according to claim 1, wherein the access control object further comprises the access policy associated with the client, wherein the access policy is indicative of one or more authorisation checks for using a digital asset associated with the client.

9. A system according to claim 1, wherein the second computing device is configured to generate a plurality of vault objects associated with the access control object.

10. A system according to claim 1, wherein the first computing device is configured to generate a plurality of digital asset objects associated with the vault object.

11. A system according to claim 1, wherein the first computing device is configured to authorise access to the digital asset contained in the digital asset object in dependence on the first dataset contained in the vault object.

12. A system according to claim 1, wherein the first computing device is further configured to:
receive the vault object;
calculate the verification identifier based on the first dataset of the received vault object.

13. A system according to claim 12, wherein the vault object is verified as being associated with the access control object and the digital asset object if the verification identifier matches the vault identifier.

14. A system according to claim 12, wherein the first computing device is further configured to process the result of the one or more executed authorisation checks based on an access policy defined by the access control object, wherein the access policy is indicative of one or more authorisation checks for using the digital asset.

15. A system according to claim 11, wherein the first computing device is further configured to evaluate the integrity of the access control object and digital asset object using one or more integrity cryptographic key stored in the offline environment.

16. A system according to claim 11, wherein the first computing device is further configured to verify that the first dataset of the received vault object comprises the access control identifier associated with the access policy.

17. A system according to claim 11, wherein the verification identifier is calculated by inputting the first dataset of the received vault object to a hash function.

18. A system according to claim 10, wherein the digital asset comprises a cryptographic key for digitally signing cryptographic operations, and wherein the first computing device is further configured to digitally sign a cryptographic operation using the cryptographic key of the digital asset object.

19. A computer-implemented method of generating data objects for use in controlling access to a digital asset, the method comprising:
generating an access control object comprising at least an access control identifier associated with an access policy of a client, the access control object being generated and integrity protected within a secure offline environment;
generating at least one vault object associated with the access control object, the vault object comprising:

a first dataset comprising at least the access control identifier; and a vault identifier associated therewith, wherein the vault identifier is calculated in dependence on the first dataset, the vault object being generated within an online environment; generating at least one digital asset object associated with the vault object, the digital asset object comprising at least one digital asset and the vault identifier, the digital asset object being generated and integrity protected within the secure offline environment; receiving a request for access to the digital asset, the request comprising data indicative of a result of one or more executed authorization checks; calculating a verification identifier based on the first dataset of the vault object; verifying that the vault object is associated with the access control object and digital asset object based on a comparison of the verification identifier and the vault identifier; and authorizing access to the digital asset in dependence on the verifying.

* * * * *